(12) United States Patent
Haas et al.

(10) Patent No.: US 6,795,318 B2
(45) Date of Patent: Sep. 21, 2004

(54) PORTABLE MODULAR ELECTRONIC SYSTEM

(75) Inventors: William R. Haas, Fort Collins, CO (US); Kirk S. Tecu, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/307,034

(22) Filed: Nov. 27, 2002

(65) Prior Publication Data

US 2004/0100776 A1 May 27, 2004

(51) Int. Cl.⁷ .................................................. H05K 7/10
(52) U.S. Cl. ...................... 361/729; 361/730; 361/728; 361/733; 361/735; 700/19
(58) Field of Search ................................. 361/728–731, 361/733, 735; 29/463, 469, 466, 464; 700/11, 17, 19, 86; 345/156, 169, 166

(56) References Cited

U.S. PATENT DOCUMENTS 5,731,945 A * 3/1998 Bertin et al. ................ 361/111
6,111,772 A * 8/2000 Lee et al. ................... 363/146
6,144,888 A * 11/2000 Lucas et al. ................. 700/83
6,505,087 B1 * 1/2003 Lucas et al. ................. 700/83

OTHER PUBLICATIONS

"Pen Drive USB Flash Hard Drive", KTI Netwoorks, Inc., www.pendrive.com. Oct. 9, 2002.

"Quick Specs Storage Works by Compag RAID Array 4100", Compaq Computer Corporation, Jan. 9, 2002.

"Palm™ Products", Palm, Inc., www.palm.com. Nov. 1, 2002.

* cited by examiner

*Primary Examiner*—David Martin
*Assistant Examiner*—Dameon E. Levi

(57) ABSTRACT

A portable modular electronic system comprises a controller module, at least one memory module; and at least one application module that are mechanically connectable and disconnectable with respect to each other and include mating electrical connectors for communicating electrical signals between modules when the modules are mechanically connected.

51 Claims, 5 Drawing Sheets

PORTABLE MODULAR ELECTRONIC SYSTEM

BACKGROUND OF THE INVENTION

1. Field of the Invention

This invention relates to electronic systems, and more particularly to portable modular electronic systems.

2. Description of the Related Art

Numerous processor-controlled electronic applications (also referred to as "appliances") have been developed, such as portable digital moving Picture Experts Group Layer 3 Standard (MP3) audio players, digital still or video cameras, digital voice recorders and personal data assistants (PDAs). Some of these applications must be plugged into a personal computer (PC) to operate, while others are stand-alone portable devices. For example, MP3 players are portable with built-in hard drive memories. However, even such portable devices cannot interface with other applications without an intervening PC, and by themselves are limited to a single application.

Portable data storage devices are also available, such as the Pen Drive™ memory drive by KTI Networks, Inc., a plug-and-play unit that is automatically detected as a removable drive when plugged into a USB (universal serial bus) port on a computer. It can be used to read, write, copy, delete and move data to or from a hard disk drive, and can play MP3 files, run applications or view videos. However, it has a limited storage capacity and, since it must be plugged into a computer, the overall system is not portable.

Portable handheld computers by Palm, Inc. have a connector at the bottom that allows consumers to snap-on various applications, such a camera, Global Positioning System (GPS) receiver, bar code scanner, recorder or modem. However, they are limited to only a single application at a time, and there is only one way to position the application device before it can be added.

Controllers associated with a pair of redundant hard drives are also known, such as the RAID (redundant array of industry standard DIMMs (dual in-line memory modules)) system by Compaq Computer Corporation. Again, however, such systems are not portable. When used with a portable application such as an MP3 player, the application must be connected to the controller/memory combination and thus loses its portability.

SUMMARY OF THE INVENTION

One embodiment of the present invention comprises a modular system in which a controller module, at least one memory module and at least one application module are mechanically connectable and disconnectable with respect to each other and comprise mating electrical connectors for communicating electrical signals between modules when the modules are mechanically connected.

The controller module in one embodiment comprises a housing with controller electronics within the housing, and electrical connectors on at least two different sides of the housing for electrical connection to other modules of the system, the electrical connectors being connected to the controller electronics.

An application module in one embodiment comprises a housing with application electronics within the housing, and electrical connectors on at least two different sides of the housing for electrical connection to other modules to which the application module is mechanically connected, the electrical connectors being connected to the application electronics.

These and other features and advantages of the invention will he apparent to those skilled in the art from the following detailed description, taken together with the accompanying drawings.

DETAILED DESCRIPTION

Figure 1:
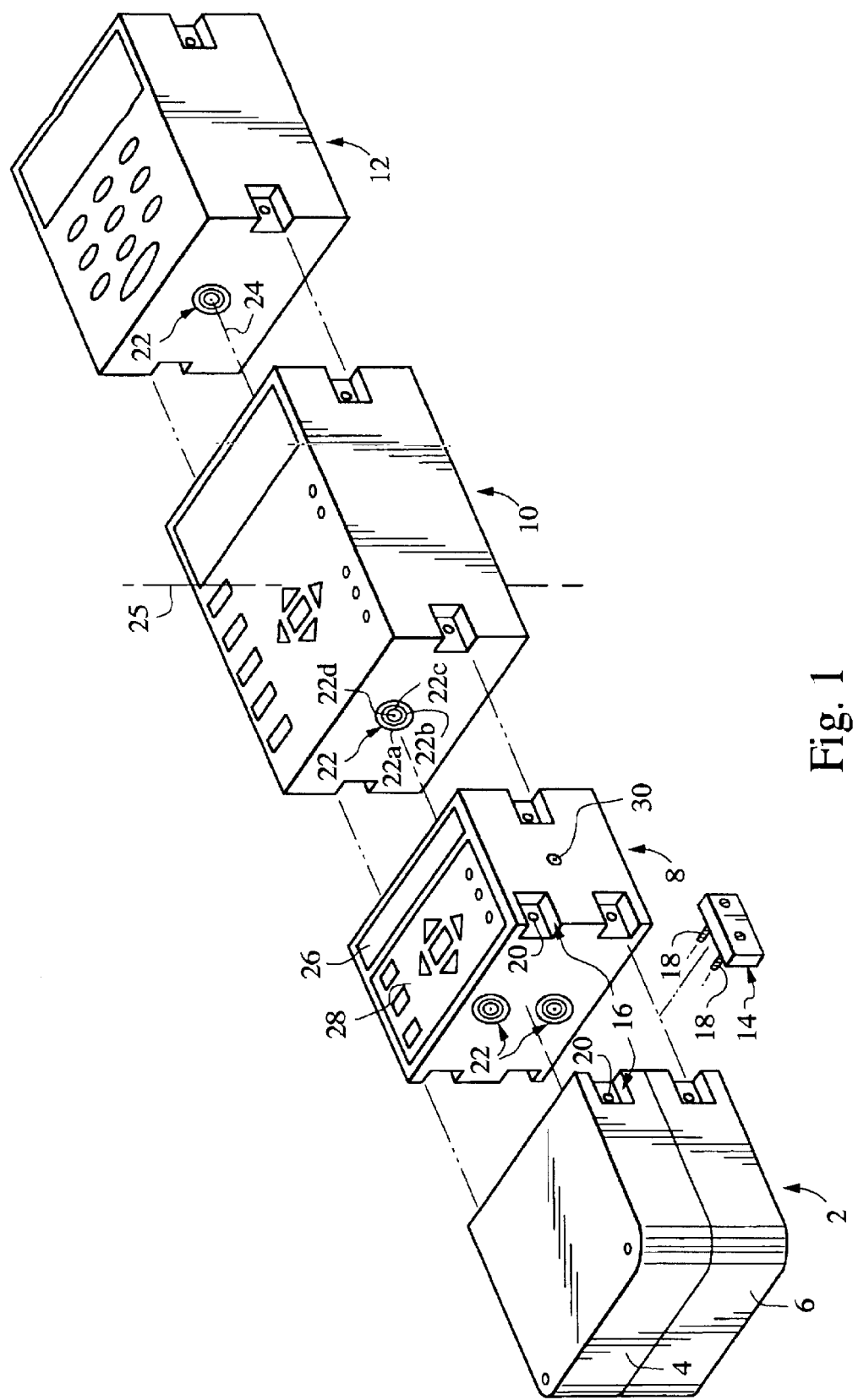
FIGS. 1 and 2 are exploded perspective views of two embodiments of a portable modular electronic system in accordance with the invention.

Embodiments of the present invention provide a portable modular electronic system that can support multiple different applications simultaneously, with a great deal of flexibility in their selection, dimensions and orientations, and that can also have redundant backup memory capabilities. Such systems are very easy for the untrained consumer to adapt for any of numerous different applications. An example of such a system is illustrated in FIG. 1, consisting of a memory module 2 that comprises a pair of independent redundant memories 4 and 6, a controller module 8 and at least one application module, with a pair of application modules 10 and 12 shown in the figure. The controller module 8 controls the flow of data between the memory module 2 and the application modules 10 and 12.

The various modules can be connected together into a handheld unified stack by any convenient mechanical connector mechanism, such as links 14 which fit into opposing recesses 16 in adjacent modules and hold the modules together with screws 18 which extend through openings in the links into aligned tapped holes 20 in the modules. Only one link 14 is illustrated in FIG. 1, but additional links would be provided for each opposed pair of module recesses.

Inter-module electrical communication is provided by mutually-aligned electrical connectors 22 on opposing faces of adjacent modules. In the figure, only the electrical connectors on the visible left-side faces of the controller and application modules are shown; additional connectors would be provided on their opposite faces. Since the memory module 2 is designed as an end module in this embodiment, electrical connectors are provided only on its right-hand side, facing the controller module 8. In this example each independent memory unit 4 and 6 has its own electrical connector, each of which is aligned with a corresponding electrical connector in the controller module 8. Thus, the controller module has a pair of electrical connectors 22 on its left-hand side facing the memory module 2, and a single electrical connector on its right-hand side facing the first application module 10.

The electrical connectors 22 (shown in greater detail in FIG. 4) can have a standard USB format, with two power lines and two data lines. The various lines are preferably implemented as three concentric conductive rings 22a, 22b, 22c and a central conductor 22d, which mate with corresponding rings and a central conductor in the electrical connector for the adjacent module when the two modules are brought together. The concentric rings are symmetrical about the axis 24 of the stacked modules, allowing the various modules to be assembled together with any desired individual rotational orientations about the axis without impairing the functionality of the system. The facing pairs of electrical connectors on the memory and controller modules are also symmetrically located on their respective modules, allowing these two modules to be rotated 180° with respect to each other and still retain an alignment between opposing electrical connectors. The portability of the system is enhanced by virtue of the electrical connectors in this embodiment being integral with their respective modules, with electrical connections between adjacent modules not established until the modules are positioned to be mechanically connected together.

This flexible alignment system makes it very easy for the casual consumer to assemble individual modules into an overall portable handheld system. It does not matter whether the various modules face up or down; their electrical connectors will still establish connections with adjacent modules. Universal mechanical connectors can also be envisioned that would permit the application modules to be oriented at any arbitrary rotational angle about the axis while still retaining the necessary intermodule electrical connections, rather than the 180° rotation enabled by the links 14. Furthermore, the application modules can be rotated 180° about a vertical axis 25, reversing the positions of their left- and right-hand faces shown in FIG. 1. While this would place the electrical connector 22 on the right-hand face of application module 10 in contact with the connector on controller module 8, as explained below the opposed electrical connectors for each application module can be connected together by a common bus that runs through the module to eliminate any electrical difference between the two connectors.

The positions of the application modules 10 and 12 within the stack can also be reversed. When connected together, the electrical connectors 22 and internal buses through each application module form in effect a single common bus for the string of application modules, allowing the controller module 8 to communicate with any desired application module by means of digital codes previously stored in the application and controller modules. Thus, a signal transmitted from the controller module to the application modules would be prefaced with the code of the module for which the signal is intended, so only that module actually processes the signal. Return signals would be coded in a similar manner to enable the processor module to identify the application module which originated the signal, and indicate to other modules to refrain from acting on the signal.

While the various modules are shown with separate electrical and mechanical connectors, both functions could be integrated into a common connector, such as that used by the PenDrive memory previously mentioned. However, such common connectors typically employ a male-female arrangement for the two elements being connected together, which reduces the flexibility in module orientation achieved with the gender-neutral connectors illustrated in FIG. 1.

The redundant memories 4 and 6 are typically hard drives, but can also be flash memories or any other portable memory device with desired capacity, protection against movement in a portable system, and compatibility with the controller module. The system could also be implemented with only one memory unit if redundancy is not needed, or with more than one redundant memory.

The memories provide mass data storage redundancy that enables one memory to take over when the other has failed or become corrupted. They would normally be operated in a conventional master-slave fashion by the controller module, with one memory unit acting as the primary storage and the other as a backup. Since they preferably store the same data, they can be connected to the controller module in either memory position. If one memory unit fails, it is simply mechanically disconnected from the system and replaced with a new unit, with the controller module copying the data stored in the remaining memory unit into the new one. The memory units 4, 6 are connected to the controller module 8 by separate sets of links 14 to enable the units' independent replacement.

The controller module 8 typically includes a display 26, and a user interface pad 28 that enables the consumer to enter desired commands. The controller is also normally supplied with a battery compartment (not shown) to provide power for all the modules in the system through the power buses provided by the electrical connectors 22 and internal module circuitry. A power port 30 can also be provided for an external power source, although in portable use the system would normally operate off its battery(ies).

Any desired number of application modules can be integrated into the stack, with a great degree of flexibility in their orientations as described above. This makes it possible to store data in an easily portable location and have it accessible by multiple applications. Various types of straps, clamps and fasteners separate from the electrical connectors can be used for inter-module mechanical connection. An outer housing into which the various modules are placed could also be provided, with an adjustable end plate or the like to hold the modules together with their adjacent electrical connectors in contact with each other. nectors in contact with each other. However, this would be more cumbersome and less flexible.

One of the advantages of the system is that it allows for multiple application modules that are different not only in their function, but in their dimensions along the system axis 24. The module dimensions in other directions can also be varied. By keeping the connector modules 22 at the centers of their respective faces, the system enables the incorporation of smaller modules that may be developed in the future.

The controller data rate is typically greater than that for any single application, making it possible to simultaneously run multiple application modules off the single controller module. The application modules would normally utilize buffers to store the controller data.

Figure 2:
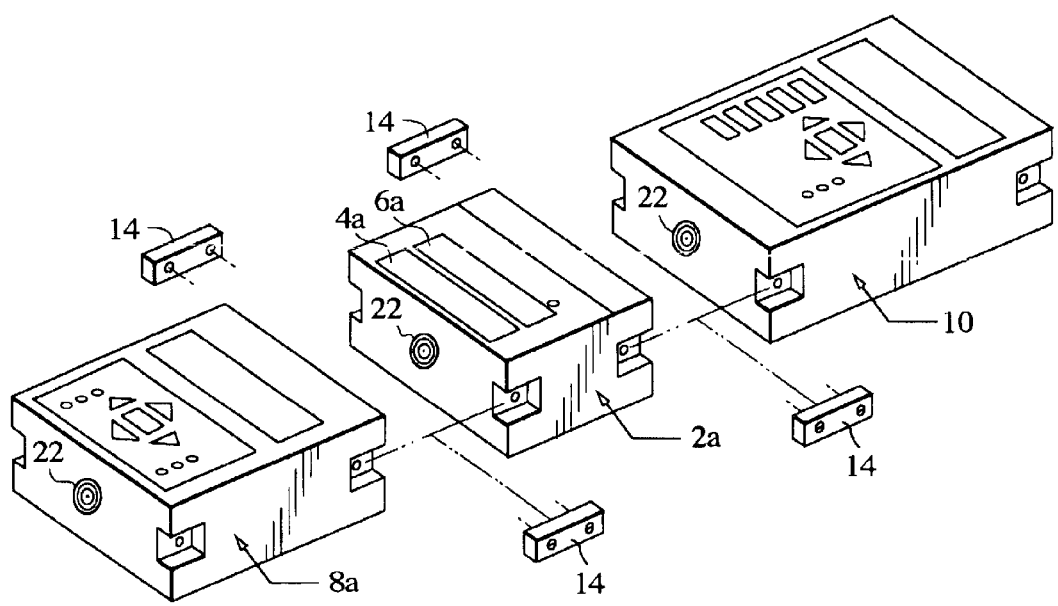

An alternate modular system is illustrated in FIG. 2, with two independent redundant memory units 4a and 6a in a common memory module housing 2a. The two memory units can be independently removed from the housing and replaced. Only a single electrical connector 22 is provided on each face of the housing along the system axis, with each memory unit 4a and 6a connected to the common data and power buses running through the module between its opposed electrical connectors. The controller module 8a distinguishes between the two memory units by means of conventional identification codes associated with each unit.

Since the memory module 2a has only a single electrical connector at each opposite face, it can be placed at any desired location within the stack, rather than being restricted to an end location as shown in FIG. 1. Memory module 2a is instead shown located between the controller module 8a and the application module 10. Since the controller module needs only a single electrical connector to interface with the memory module, the electrical connectors on its opposite faces are also centered on the system axis, enabling the controller module to likewise be positioned at any convenient location within the stack. As shown in FIG. 2, it is at the end of the stack, with one of its electrical connectors aligned with the memory module 2a and the electrical connector on its opposite face exposed. The exposed connector could be covered with a cap if desired, or another application module could be connected to this side of the controller module. Since the controller module communicates with all of the other modules via the common data and power bus running through the connected modules, identifying each different module by its respective identification code, the stack can be assembled with the various modules in any arbitrary position. This makes it very easy for the novice consumer to use. If a particular application module is no longer desired, it can simply be removed from the stack. If it occupies an intermediate position in the stack, it would be disconnected from the modules on either side, removed, and the remaining modules connected back together. New application modules can be added simply by connecting them to either end of the existing stack, or by disconnecting two modules, inserting the new application module in between and reconnecting the modules to the new application module, if desired. Once the controller and memory modules have been connected to the desired application modules, they behave as a single device.

Figure 3:
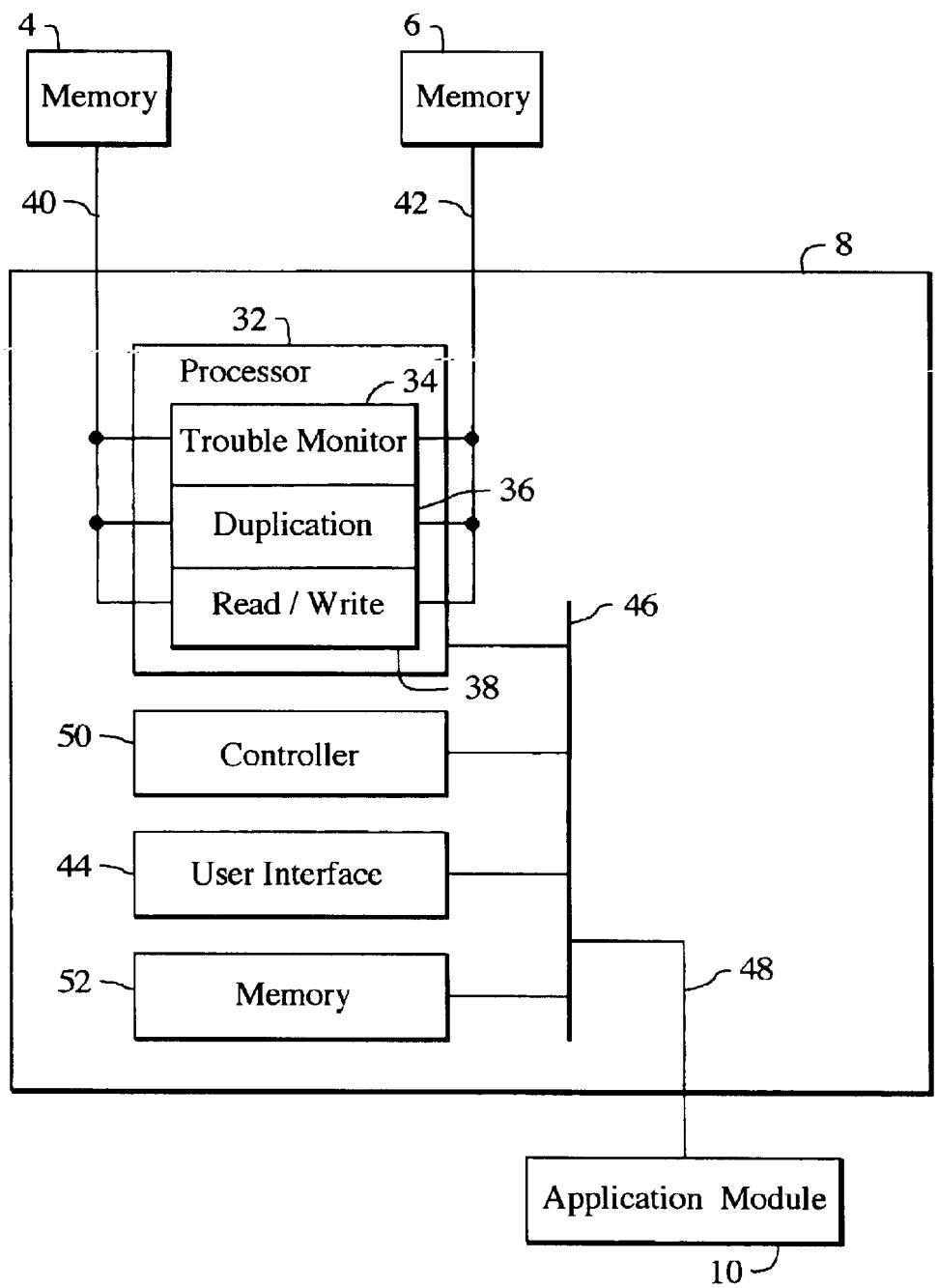
FIG. 3 is a block diagram illustrating the internal organization of one embodiment of a controller module in relation to memory and application modules.

A simplified block diagram illustrating the intermodule electrical connections for one embodiment of a controller module consistent with the teachings of the invention is presented in FIG. 3. The controller module 8 includes a processor 32 with a trouble monitor 34, a data duplication control 36 and a read/write control 38. These various elements can be implemented in firmware, or with a software controlled general purpose digital signal processor (DSP). They are connected through separate lines 40, 42, corresponding to the separate electrical connectors 22 in the common face of the controller module 8 shown in FIG. 1, to the memory units 4 and 6. The trouble monitor 34 determines whether the memories are correctly operating, and notifies the user of any problems by communicating with a user interface 44 through a bus 46. Data in one memory is loaded into the other memory in a master-slave fashion, without the intervention of an external PC, by the duplication control 36, which also communicates through the bus 46 and user interface 44 to provide the user with information on the status of the duplication function. The read/write control 38 governs the read/write of application data to and from the memories 4 and 6, communicating with the application modules through the bus 46 and a line 48 formed by the combined electrical connectors and internal module buses from the controller module 8 to the desired application module.

The operation of the module 8 is governed by a controller 50, which communicates with the processor 32 through bus 46 and may be integrated on the same chip with the processor. The module also includes an internal memory 52.

While the memories 4 and 6 are shown in direct communication with processor 32, corresponding to the arrangement of FIG. 1, they could also communicate with the processor through bus 46, corresponding to the arrangement of FIG. 2. This version would utilize a data protocol with an addressing scheme that is managed by the processor 32 and controller 50 to distinguish between the two memories. If the possibility of application modules on either side of the controller module is desired, as in FIG. 2, communication with the various modules could be through a hub connected to bus 46, rather than through line 48.

Figure 4:
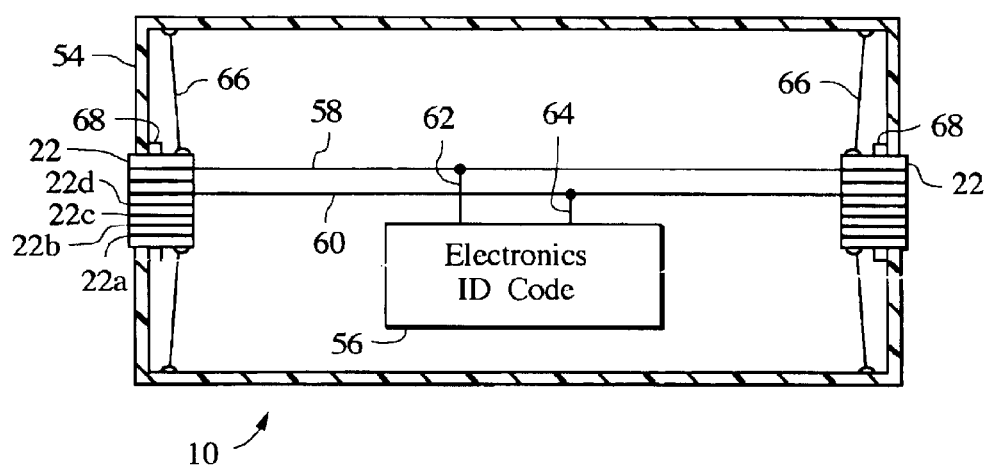
FIG. 4 is a simplified sectional view of an embodiment of an application module, such as is shown in FIGS. 1 and 2.

A simplified, somewhat conceptual view of application module 10 is given in FIG. 4. The module includes an outer housing 54, with electrical connectors 22 protruding through openings in opposite walls of the housing, slightly beyond the outer housing surface. This connector arrangement permits the module to be assembled together with other modules in a linear stack. If for some reason a nonlinear assembly of modules is desired, one or both of the connectors 22 could be placed in different walls of a module.

The module's electronic circuitry is indicated generically by block 56. It includes a programmed identification code that distinguishes the module from other application modules. Data and power buses 58 and 60, which can be electrical conductors or optical buses, extend through the interior of the module between corresponding conductive rings and the central conductors of the opposed connectors 22. Two data and two power buses are actually included in the standard USB configuration, but only one of each is shown for simplicity. The module electronics tap into the data and power buses at taps 62 and 64 to provide power and two-way communication with the memory module, under the control of the controller module and the application module's user interface. The electronics within any other application modules would similarly tap into the data and power buses, which would electrically extend continuously through all of the application modules (and also through the controller and memory modules in the FIG. 2 embodiment).

The connectors 22 can be implemented with plastic plugs into which the conductive rings 22a, 22b, 22c and center conductor 22d are set, with the plugs mechanically biased to inactive positions protruding slightly beyond the limits of the module housing 54 by a spring bias. Suitable spring biases include flexible resilient webs 66 attached at their outer peripheries to the interior of the housing to bias the connectors outward, with stops 68 around the peripheries of the connector plugs to limit their travel outward from the housing and coil springs (not shown) lodged between the interior plug faces and supports within the module housing. When the housing 10 is butted against the housing for an adjacent module, the opposed connector plugs push each other back into their respective modules until their outer faces are substantially flush with the walls through which they protrude, with the spring force of web 66 urging them outward against the mating connector in the other module. A firm electrical contact is thereby established between the two modules.

Figure 5:
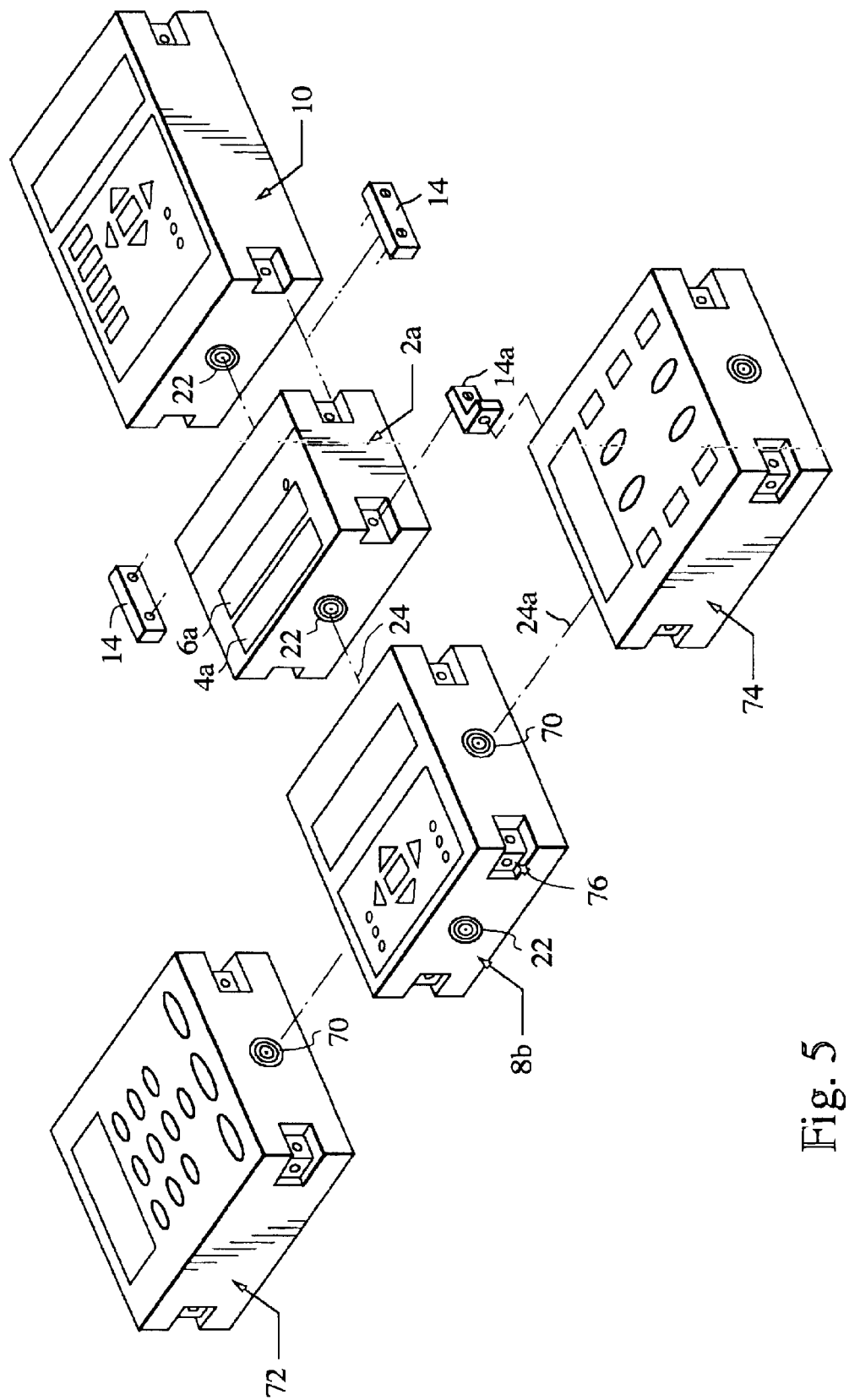
FIG. 5 is an exploded perspective view of another embodiment of a portable modular electronic system with modules in a non-linear arrangement.

It is not necessary for the various modules in the system to be axially aligned as in FIGS. 1 and 2, and a capability to connect a given module to more than two other modules can also be provided. For example, in the embodiment illustrated in FIG. 5, a controller module 8b, memory module 2a and application module 10 are shown in alignment along an axis 24 as in FIG. 2, with controller module 8b differing from controller module 8a of FIG. 2 by the addition of electrical connectors 70 on opposite sides of the module, along an axis 24a that is orthogonal to the system axis 24. The additional electrical connectors 70 are connected to the internal module bus in a manner similar to the connectors 22.

Additional application modules 72 and 74 can be connected to respective electrical connectors 70 on opposite sides of controller module 8b. The recesses 76 in the controller module 8b are modified from the recesses 20 shown in FIGS. 1 and 2 to make them symmetrical about the module corners in which they are formed, so that they can accommodate additional modules along either axis 24 or 24a. Modified corner connector links 14a are also provided for the joinder locations of three modules, such as 8b, 2a and 74. Other modules within the system could also be provided with more than two electrical connectors, and the shapes of the module housings could be altered from the rectangular shape illustrated to enable coupling to other modules at different angles.

The modular system which has been described enables a flexible number of electronic applications to be integrated into a portable handheld system, without regard to specific orientation. While specific embodiments of the invention have been shown, numerous variations and alternate embodiments will occur to those skilled in the art. For example, many different module shapes can be accommodated, and the number of different application modules that could be supported would be limited only by the capacities and data rates of the memory and controller modules, and any gross size limitations on the assembled system. Accordingly, the invention should be limited only in terms of the appended claims.

We claim:

1. A portable modular electronic system, comprising:
   at least one memory module for storing data,
   at least one application module, and a controller module for controlling communications between said at least one memory module and said at least one application module,
   said memory, application and controller modules being mechanically connectable and disconnectable with respect to each other and comprising a handheld, portable system with mating electrical connectors for communicating electrical signals between modules when the modules are mechanically connected,
   said application module comprising a plurality of electrical connectors on different respective sides of the module, and an internal bus electrically connecting said connectors.

2. The system of claim 1, said at least one memory module comprising a plurality of redundant memories.

3. The system of claim 2, wherein said redundant memories are independently replaceable.

4. The system of claim 2, wherein said memories include separate respective electrical connectors for independently communicating with said controller module.

5. The system of claim 2, wherein said memory module further comprises a common electrical connector for said plurality of memories.

6. The system of claim 2, wherein said controller module is programmed to distinguish between said memories by respective identification codes associated with each of said memories.

7. The system of claim 1, comprising a plurality of application modules that are mechanically connectable and disconnectable with respect to other modules of said system and include respective electrical connectors that mate with the electrical connectors on said other modules when they are mechanically connected.

8. A. The system of claim 1, wherein said at least one memory module, said controller module and said at least one application module are aligned along an axis when mechanically connected together.

9. The system of claim 1, comprising a plurality of application modules, wherein at least some of said application modules have different dimensions.

10. The system of claim 1, wherein said electrical connectors enable multiple rotational orientations between said modules.

11. The system of claim 1, further comprising mechanical connectors independent of said electrical connectors for mechanically connecting said modules.

12. A controller module for a portable modular electronic system, comprising:
    a housing,
    controller electronics within said housing,
    electrical connectors on at least two different sides of said housing for electrical connection to other modules of said system, said electrical connectors connected to said controller electronics and enabling multiple rotational orientations between said controller module and a mating connector of another module, while retaining an alignment between said mating connectors,
    said electrical connectors enabling said controller module to be oriented in different rotational positions with respect to other modules to which it is mechanically connected, and mechanical couplings having releasable connectors that releasably connect said controller module to said other modules in each of different rotational positions.

13. The controller module of claim 12, further comprising a pair of electrical connectors on one side of said housing for connecting to respective independent memories of said system, said pair of electrical connectors being separately connected to said controller electronics.

14. The controller module of claim 12, wherein said controller electronics are programmed to communicate with redundant memories through one of said electrical connectors and to distinguish between said memories by identification codes.

15. The controller module of claim 12, further comprising mechanical connector elements for mechanically connecting said module to other modules independent of said electrical connectors.

16. An application module for a portable modular electronic system, comprising:
    a housing,
    application electronics within said housing,
    electrical connectors on at least two different respective sides of said housing for electrical connection to other modules to which said application module is mechanically connected, said electrical connectors connected to said application electronics and enabling multiple rotational orientations between said application module and a mating connector of another module, while retaining an alignment between said mating connectors, and a bus connected to said application electronics, said bus also connected to said electrical connectors to enable electrical communication along said bus between other modules connected to said application module.

17. The application module of claim 16, said application electronics connected to said bus and including an identification code, enabling communication along said bus between said application module and another module to which it is connected.

18. The application module of claim 16, further comprising mechanical connector elements for mechanically connecting said module to other modules.

19. The portable modular electronic system of claim 1, the connectors of said modules enabling multiple rotational orientations between said modules while retaining an alignment between mating connectors.

20. The portable modular electronic system of claim 19, said connectors enabling said modules to be assembled in a stack in multiple different relative positions within said stack.

21. The portable modular electronic system of claim 20, each application module including a respective user interface as part of said module.

22. The portable modular electronic system of claim 21, at least one of said memory modules comprising a plurality of redundant memories.

23. The portable modular electronic system of claim 20, at least one of said memory modules comprising a plurality of redundant memories.

24. The portable modular electronic system of claim 19, each application module including a respective user interface as part of said module.

25. The portable modular electronic system of claim 24, at least one of said memory modules comprising a plurality of redundant memories.

26. The portable modular electronic system of claim 19, at least one of said memory modules comprising a plurality of redundant memories.

27. The portable modular electronic system of claim 1, said connectors enabling said modules to be assembled in a stack in multiple different relative positions within said stack.

28. The portable modular electronic system of claim 27, each application module including a respective user interface as part of said module.

29. The portable modular electronic system of claim 28, least one of said memory modules comprising a plurality of redundant memories.

30. The portable modular electronic system of claim 27, at least one of said memory modules comprising a plurality of redundant memories.

31. The portable modular electronic system of claim 1, each application module including a respective user interface as part of said module.

32. The portable modular electronic system of claim 31, at least one of said memory modules comprising a plurality of redundant memories.

33. The portable modular electronic system of claim 1, at least one of said memory modules comprising a plurality of redundant memories.

34. A portable modular electronic system, comprising:
at least one memory module for storing data,
at least one application module, and
a controller module for controlling communications between said at least one memory module and said at least one application module,
said memory, application and controller modules being mechanically connectable and disconnectable with respect to each other and comprising mating electrical connectors for communicating electrical signals between modules when the modules are mechanically connected, the connectors of said modules enabling multiple rotational orientations between said modules while retaining an alignment between mating connectors,
said connectors enabling said modules to be assembled in a stack in multiple different relative positions within said stack.

35. The portable modular electronic system of claim 34, each application module including a respective user interface as part of said module.

36. The portable modular electronic system of claim 35, at least one of said memory modules comprising a plurality of redundant memories.

37. The portable modular electronic system of claim 34, at least one of said memory modules comprising a plurality of redundant memories.

38. The portable modular electronic system of claim 34, each application module including a respective user interface as part of said module.

39. The portable modular electronic system of claim 38, at least one of said memory modules comprising a plurality of redundant memories.

40. The portable modular electronic system of claim 34, at least one of said memory modules comprising a plurality of redundant memories.

41. A portable modular electronic system, comprising:
at least one memory module for storing data,
at least one application module, and
a controller module for controlling communications between said at least one memory module and said at least one application module,
said memory, application and controller modules being mechanically connectable and disconnectable with respect to each other and comprising mating electrical connectors for communicating electrical signals between modules when the modules are mechanically connected, said connectors enabling said modules to be assembled in a stack in multiple different relative positions within said stack without reconfiguring the controller module.

42. The portable modular electronic system of claim 41, each application module including a respective user interface as part of said module.

43. The portable modular electronic system of claim 42, at least one of said memory modules comprising a plurality of redundant memories.

44. The portable modular electronic system of claim 43, at least one of said memory modules comprising a plurality of redundant memories.

45. A portable modular electronic system, comprising:
at least one memory module for storing data,
at least one application module, each application module including a respective user interface as part of said module, and
a controller module for controlling communications between said at least one memory module and said at least one application module,
said memory, application and controller modules being mechanically connectable and disconnectable with respect to each other and comprising mating electrical connectors for communicating electrical signals between modules when the modules are mechanically connected.

46. The portable modular electronic system of claim 45, at least one of said memory modules comprising a plurality of redundant memories.

47. A portable modular electronic system, comprising:
at least one memory module for storing data,
at least one application module, and
a controller module for controlling communications between said at least one memory module and said at least one application module,
said memory, application and controller modules being mechanically connectable and disconnectable with respect to each other and comprising mating electrical connectors for communicating electrical signals between modules when the modules are mechanically connected, at least one memory module comprising a plurality of redundant memories.

48. An application module for a portable modular electronic system, comprising:
a housing,
application electronics within said housing,
electrical connectors on at least two different respective sides of said housing for electrical connection to other modules to which said application module is mechanically connected, said electrical connectors connected to said application electronics and enabling multiple rotational orientations between said application module and a mating connector of another module, while retaining an alignment between said mating connectors, said electrical connectors enable said application module to be oriented in different rotational positions with respect to other modules to which it is mechanically connected.

49. The application module of claim 48, further comprising a bus connected to said application electronics, said bus also connected to said electrical connectors to enable electrical communication along said bus between other modules connected to said application module.

50. The application module of claim 49, said application electronics connected to said bus and including an identification code enabling communication along said bus between said application module and another module to which it is connected.

51. The application module of claim 48, further comprising mechanical connector elements for mechanically connecting said module to other modules.

* * * * *